United States Patent
Melideo

(10) Patent No.: US 7,702,565 B2
(45) Date of Patent: Apr. 20, 2010

(54) REVERSE BILLING IN ONLINE SEARCH

(75) Inventor: John Melideo, Westlake Village, CA (US)

(73) Assignee: Q Tech Systems, LLC, Westlake Village, CA (US)

( * ) Notice: Subject to any disclaimer, the term of this patent is extended or adjusted under 35 U.S.C. 154(b) by 626 days.

(21) Appl. No.: 11/097,640

(22) Filed: Apr. 1, 2005

(65) Prior Publication Data

US 2006/0106711 A1    May 18, 2006

Related U.S. Application Data

(60) Provisional application No. 60/629,224, filed on Nov. 17, 2004, provisional application No. 60/641,547, filed on Jan. 4, 2005.

(51) Int. Cl.
*G06Q 40/00* (2006.01)
(52) U.S. Cl. ............................................ 705/37
(58) Field of Classification Search .................. 705/23, 705/27, 37; 379/132
See application file for complete search history.

(56) References Cited

U.S. PATENT DOCUMENTS

| | | | |
|---|---|---|---|
| 5,452,289 A | | 9/1995 | Sharma et al. |
| 5,483,362 A | | 1/1996 | Fukuyama et al. |
| 5,483,581 A | * | 1/1996 | Hird et al. .................... 379/132 |
| 5,689,652 A | * | 11/1997 | Lupien et al. ................. 705/37 |
| 5,790,638 A | | 8/1998 | Bertacchi |
| 5,794,207 A | * | 8/1998 | Walker et al. .................. 705/1 |
| 5,838,682 A | | 11/1998 | Dekelbaum et al. |
| 5,845,265 A | * | 12/1998 | Woolston ...................... 705/37 |
| 5,862,223 A | * | 1/1999 | Walker et al. ................. 705/50 |
| 5,867,562 A | | 2/1999 | Scherer |
| 5,926,754 A | | 7/1999 | Cirelli |
| 5,944,791 A | | 8/1999 | Scherpbier |
| 5,956,483 A | | 9/1999 | Grate |
| 6,011,794 A | | 1/2000 | Mordowitz et al. |
| 6,028,917 A | | 2/2000 | Creamer et al. |
| 6,031,836 A | | 2/2000 | Haserodt |
| 6,069,890 A | | 5/2000 | White et al. |

(Continued)

OTHER PUBLICATIONS

Todd Coopee "Four services get down to business" InfoWorld. San Mateo: May 29, 2000. vol. 22, Iss. 22; p. 44, 2 pgs.*

(Continued)

*Primary Examiner*—Hani Kazimi
*Assistant Examiner*—Edward Chang
(74) *Attorney, Agent, or Firm*—SoCal IP Law Group LLP; Steven C. Sereboff; Mark A. Goldstein

(57) ABSTRACT

There is disclosed reverse billing in online search. A telephony server may receive a request from a user to cause a telephone call to be established between the user and a merchant. A notice to the merchant may be generated. The notice may include an offer to establish a telephone call with the user in exchange for payment of a definite fee. An acceptance of the offer may be received from the merchant to a phone number associated with the merchant. A first voice communication leg with the user and a second voice communication leg with the merchant may be bridged to establish the telephone call between the user and the merchant. The definite fee may be appear on the merchant's bill for telephone service.

8 Claims, 7 Drawing Sheets

U.S. PATENT DOCUMENTS

| | | | |
|---|---|---|---|
| 6,072,865 A | | 6/2000 | Haber |
| 6,115,461 A | * | 9/2000 | Baiyor et al. .......... 379/211.02 |
| 6,130,933 A | | 10/2000 | Miloslavsky |
| 6,144,667 A | | 11/2000 | Doshi |
| 6,157,954 A | | 12/2000 | Moon |
| 6,249,576 B1 | | 6/2001 | Sassin et al. |
| 6,263,365 B1 | | 7/2001 | Scherpbier |
| 6,269,361 B1 | | 7/2001 | Davis |
| 6,275,490 B1 | | 8/2001 | Mattaway et al. |
| 6,337,858 B1 | | 1/2002 | Petty et al. |
| 6,470,079 B1 | | 10/2002 | Benson |
| 6,535,506 B1 | | 3/2003 | Narain et al. |
| 6,535,909 B1 | | 3/2003 | Rust |
| 6,600,503 B2 | | 7/2003 | Stautner et al. |
| 6,636,504 B1 | | 10/2003 | Albers |
| 6,639,977 B1 | * | 10/2003 | Swope et al. ........... 379/114.21 |
| 6,670,968 B1 | | 12/2003 | Schilit |
| 6,690,663 B1 | | 2/2004 | Culver |
| 6,691,302 B1 | | 2/2004 | Skrzynski |
| 6,707,811 B2 | | 3/2004 | Greenberg et al. |
| 6,731,630 B1 | | 5/2004 | Schuster |
| 6,788,674 B1 | | 9/2004 | Karamchedu |
| 6,834,048 B1 | | 12/2004 | Cho |
| 6,870,828 B1 | | 3/2005 | Giordano |
| 6,938,067 B2 | | 8/2005 | Hershenson |
| 6,973,091 B1 | | 12/2005 | Hester |
| 7,035,384 B1 | | 4/2006 | Scherer |
| 7,058,356 B2 | | 6/2006 | Slotznick |
| 7,080,049 B2 | | 7/2006 | Truitt |
| 7,092,496 B1 | | 8/2006 | Maes |
| 7,110,368 B2 | | 9/2006 | Perry |
| 7,120,235 B2 | | 10/2006 | Altberg |
| 7,130,298 B1 | | 10/2006 | Smith |
| 7,170,995 B2 | | 1/2007 | Johnson |
| 7,203,186 B1 | | 4/2007 | Fuller |
| 7,215,744 B2 | | 5/2007 | Scherer |
| 7,222,304 B2 | | 5/2007 | Beaton |
| 7,257,201 B2 | | 8/2007 | Singh |
| 2002/0083093 A1 | | 6/2002 | Goodisman et al. |
| 2002/0089938 A1 | | 7/2002 | Perry |
| 2003/0014331 A1 | * | 1/2003 | Simons ....................... 705/27 |
| 2003/0033375 A1 | | 2/2003 | Mitreuter |
| 2003/0079024 A1 | | 4/2003 | Hough et al. |
| 2003/0140091 A1 | | 7/2003 | Himmel |
| 2003/0185232 A1 | | 10/2003 | Moore et al. |
| 2003/0190888 A1 | * | 10/2003 | Mangal et al. ............. 455/3.05 |
| 2004/0078476 A1 | | 4/2004 | Razdow |
| 2004/0122810 A1 | | 6/2004 | Mayer |
| 2004/0198328 A1 | | 10/2004 | Brandenberger |
| 2004/0240642 A1 | | 12/2004 | Crandell et al. |
| 2004/0252820 A1 | | 12/2004 | Faber |
| 2005/0074102 A1 | | 4/2005 | Altberg |
| 2005/0114210 A1 | | 5/2005 | Faber |
| 2005/0119957 A1 | | 6/2005 | Faber |
| 2005/0165666 A1 | | 7/2005 | Wong |
| 2005/0216364 A1 | * | 9/2005 | Jurisic et al. ................... 705/26 |
| 2005/0289471 A1 | | 12/2005 | Thompson et al. |

OTHER PUBLICATIONS

Kawakami Z. "New management and information system infrastructure for cyberspace" Hitachi Review. ISSN: 0018-277X, 1997, vol. 46, pp. 153-158. (3 ref.).*

C. J. Weigand, Indispensible software on-line, Home Office Computing, Apr. 1992, v10 n4 p. 20.

Rosenberg et al, SIP Event Packages for Call Leg and Conference State, http://www.jdrosen.net/sip_callpkg.html, Mar. 2002.

Porter, Brad, Call Control Requirements in a Voice Browser Framework, http://www.w3.org/TR/call-control-reqs/, Apr. 13, 2001.

USPTO, Notice of Allowability for U.S. Appl. No. 10/614,394, filed Jul. 3, 2003 entitled Displaying Telephone Numbers as Active Objects, mail date Jul. 18, 2008.

USPTO, Office Action for U.S. Appl. No. 10/821,701, filed Apr. 9, 2004 entitled Telephone Calling Interface, mail date Mar. 31, 2009.

USPTO, Notice of 1st Office Action for U.S. Appl. No. 11/278,353, filed Mar. 31, 2006 entitled Application Independent Call Initiation, mail date Sep. 25, 2009.

* cited by examiner

REVERSE BILLING IN ONLINE SEARCH

RELATED APPLICATION INFORMATION

This patent application claims priority from Provisional Patent Application No. 60/629,224 filed Nov. 17, 2004 and Provisional Patent Application No. 60/641,547 filed Jan. 4, 2005, both of which are incorporated herein by reference in their entirety.

The following related patent applications are hereby incorporated by reference in their entirety:

a. application Ser. No. 10/614,394 filed Jul. 3, 2003 entitled Displaying Telephone Numbers as Active Objects;

b. application Ser. No. 10/691,982 filed Oct. 22, 2003 entitled Application Independent Telephone Call Initiation;

c. application Ser. No. 10/821,467 filed Apr. 9, 2004 entitled Telephone Call Initiation Through an On-Line Search;

d. application Ser. No. 10/821,701 filed Apr. 9, 2004 entitled Telephone Calling Interface; and e. application Ser. No. 10/840,889 filed May 7, 2004 entitled Displaying and Activating Telephone Numbers.

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure as it appears in the Patent and Trademark Office patent files or records, but otherwise reserves all copyright and trade dress rights whatsoever.

BACKGROUND OF THE INVENTION

1. Field of the Invention

The invention relates to reverse billing of phone calls.

2. Description of the Related Art

A. Search Listings

In a February 2001 survey when asked where their online purchases originated, 55% of the 2,288 U.S. respondents indicated "search listings". (NPD Group) The proliferation of the Internet has created a massive consumer marketplace driven by the technology of search engines. Second only to email, web searching is the most popular activity of U.S. Internet users. (U.S. Department of Commerce) The emergence of search listings as the superior online branding medium in profits and effectiveness has given rise to a new type of marketing strategy—search engine marketing.

More and more companies are seeking creative ways to increase traffic to their web sites. One of those methods involves increasing company exposure and ranking in search listing results. In another report, it was found that 92% of online consumers use search engines to shop for and purchase items on the Internet. (NPD Group) The same report shows that good search engine rankings are two to three times more effective in generating sales than banner ads. (NPD Group)

Search engines have become one of the most effective means of connecting consumers with the products and services they seek. With so much business dependent on the output of search listing results, search engines and other types of listing services such as web portals and Internet Yellow Pages (IYP), are seeking new ways to capitalize on their technology.

B. The Cost-Per-Click Model

Cost-per-click embodies the interactivity of hyper-linking and the Web—the advertiser pays only for the page views that were clicked through from ads or links on a publisher's site. Cost-per-click is a trackable and provable method that generates leads for the advertiser in a cost effective manner.

Cost-per-click (CPC) marketing (also referred to as PPC, or Pay Per Click marketing) is based on the bid-for-placement advertising model. Cost-per-click search engine marketing essentially allows a merchant to "pay" to have its web site listed on result pages of major search engines in the form of text links and/or ads. These links are often called Paid Listings, Sponsored Links, Sponsored Listings, and Featured Listings—all of which will be referred to as Paid Listings. In general, the higher a merchant's bid, the closer to the top of the Paid Listings results the merchant's web site advertisement is placed. Therefore, if a merchant's ad has the highest bid, the merchant's site listing will appear at top of the Paid Listings results page. If the merchant's bid is the second highest, then the merchant's advertisement will appear second, and so forth.

For the major CPC engines, the top three to five bid positions are the ones that receive the highest amount of distribution across their search partner networks. When search engine visitors click on a CPC ad, they are sent to the advertiser's web site. CPC advertisers are only charged when someone clicks on the advertisement and visits the advertiser's web site.

CPC search listings are growing for two reasons: (1) The CPC model gives advertisers the ability to reach prospects when they're actively searching the Internet for goods and services; and (2) Advertisers can easily measure their return on investment (ROI). The result is a mutually beneficial relationship enabling merchants to drive more traffic to their web sites through effective advertisement, while search engines capture revenue in return for their lead generation technology. CPC strategies allow merchants to work within their budget and quantify the results of their advertising effort.

While the CPC marketing strategy has proven its worth to many merchants with a web presence, it alienates merchants that do not have web exposure in the form of e-commerce, or simple company-profile web sites. As a result, many of these merchants rely more heavily on local community exposure rather than broad web exposure. Local exposure includes traditional marketing mediums such as television, newspapers, magazines, traditional yellow pages, billboards, etc. Despite the diversity of available exposure mediums, the most common element present in all forms of advertising is simply a telephone number. The telephone remains one of the most common and effective forms of business to business and consumer to business communication. While the Internet is growing in popularity year by year, the Internet penetration rate is only at 68.8% as of July 2004 (Neilsen/NR), compared to telephone subscribership at 94.1% of American households. (FCC/Bureau of the Census)

C. The Rise of the Internet Yellow Pages (IYP)

Advancement in the digital age has catapulted the once static yellow page book listings into the Internet realm, offering merchants yet another medium of exposure. Traditional yellow page book listings have been migrated to the web to form an ever-growing network of Internet Yellow Pages (IYP).

Today, IYP directories are playing a pivotal role in providing the consuming public access to everything from where to buy a pizza to where to find a qualified plumber. It has been reported that there were more than 1.5 billion references to IYP in 2001. (Yellow Pages Integrated Media Association) Of those referencing an IYP, 59% made a contact and 60% made a purchase or intended to do so. Coupled with search engine technology, IYP provides an undeniable benefit to advertisers. The information merchants present in IYP ads is user-initiated and is perceived as an information resource rather than an advertisement. For this reason, average response rates to IYP listings are in the range of ten times higher than other forms of online advertising.

D. The Market Problem

One advantage to IYP when compared to traditional search engine listings is that merchants do not need to have a website to advertise. A distinction between IYP and traditional search engine listings lies in searchers viewing categories of listings, such as "plumbing" or "restaurants"—not necessarily keyword results. While click activity and post-click behavior in IYP listings are consistent with the CPC model, nearly 75% of responses to IYP listings are made as phone calls. (Spring 2003, Harris Interactive) This becomes problematic for the CPC marketing strategy since a phone number is not "clickable" with traditional web browsing, and phone calls are not readily trackable with traditional web listings. With traditional web browsing there is no easy way for advertisers to quantify the effectiveness of their IYP listings, nor is there an efficient way for IYP providers and listing agents to capitalize on positive lead generation resulting from IYP listings.

In addition, paid search sites are struggling to unlock the profits of local searches. There is a consumer need for relevant localized information. IYP providers want to capitalize on the success and adoption rates of CPC marketing in relation to IYP listings.

DETAILED DESCRIPTION OF THE INVENTION

Throughout this description, the embodiments and examples shown should be considered as exemplars, rather than limitations on the apparatus and methods of the invention.

A System

Figure 1:
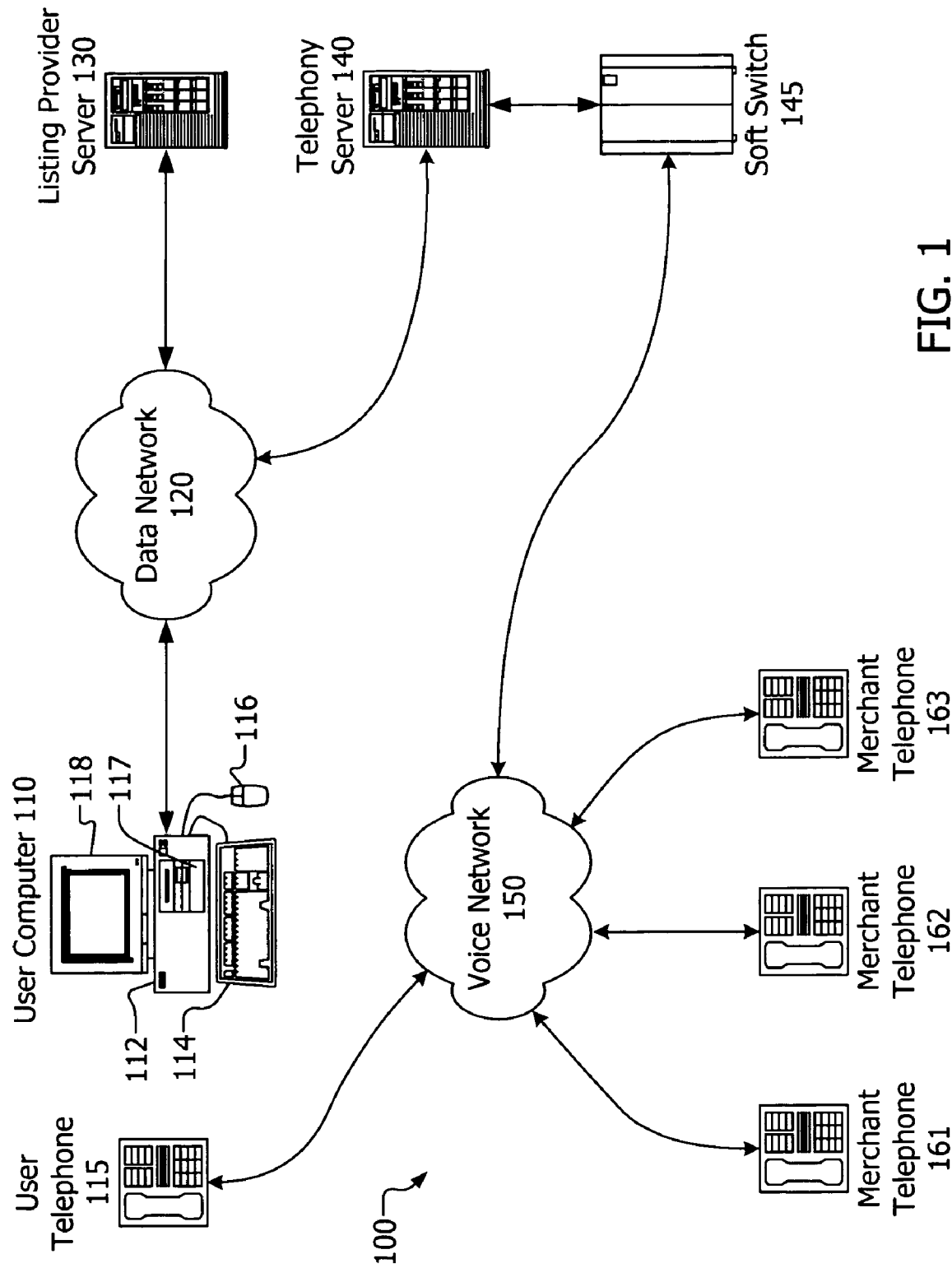
FIG. 1 is a block diagram of a system topology.

Referring now to FIG. 1 there is shown a block diagram of a system topology 100. The system topology 100 includes a user computer 110, a user telephone 115, a data network 120, a listing provider server 130, a telephony server 140, a soft switch 145, a voice network 150, and a number of merchant telephones 161, 162, 163.

The user computer 110 may be a general purpose personal computer. The user computer 110 may include a system unit 112, an output device, such as a display 118, and one or more input devices, such as, for example, a keyboard 114, a mouse 116, a track ball, a pen or stylus, a touch pad, a data glove, and others.

The user computer 110 may have a hard disk drive 117 and/or other storage devices included therein or otherwise coupled with or accessible to the system unit 112. As used herein a storage device is a device that includes and may be used to read from and write to a storage medium. Storage devices include, hard disk drives, digital versatile disk (DVD) drives, compact disk (CD) drives, microdrives, flash memory devices, and others. Storage media are machine readable and include, for example, magnetic media such as hard disks, floppy disks and tape; optical media such as CDs and DVDs; flash memory cards; and other storage media.

The system unit 112 may have included therein a motherboard having a processor and memory, such as, for example, random access memory (RAM), as well as controller devices, add-on boards, interface boards, and other devices, such as for example, a graphics adapter, a network interface card (NIC), a sound card, and others.

The user computer 110 may be a computing device such as, for example, a personal computer, computer workstation, server, portable computer, notebook computer, personal digital assistant (PDA), computing tablet, two-way messaging device (e.g., Blackberry™), smart display terminal, personal video recorder (PVR), set-top box, cellular telephone, satellite telephone, digital camera, digital music device such as, for example, an MP3 player, and others. The user computer 110 may also be a home appliance such as a television, a refrigerator, and others.

The user computer 110 may run an operating system, such as, for example, a version of the Microsoft Windows operating system, Linux, Unix, Apple MAC OS, Palm OS, and others.

The user computer 110 connects with and communicates on the data network 120 and may include an interface therefore. The user computer 110 may include a NIC, a modem or other device that supports communications on data network 120. The communications supported by the user computer 110 may adhere to one or more communications standards. The communications standards may include wired and wireless communications protocols, such as, for example, one or more versions of the User Datagram Protocol (UDP), the Transmission Control Protocol (TCP), and the Internet Protocol (IP), the 10 and/or 40 Gigabit Ethernet standards, the Fibre Channel standards, one or more varieties of the IEEE 802 standards, including 802.3 Ethernet, 802.11 Wi-Fi and 802.16 WiMAX, Asynchronous Transfer Mode (ATM), X.25, Integrated Services Digital Network (ISDN), token ring, frame relay, Point to Point Protocol (PPP), Fiber Distributed Data Interface (FDDI); proprietary protocols; and other protocols. Other communications standards supported by user computer 110 may include Universal Serial Bus (USB), IEEE 1394 commonly known as FireWire and i.link, BlueTooth, and ZigBee. The user computer 110 may be coupled with a modem, gateway or router to connect with and communicate on the data network 120.

The user computer 110 may comprise an assembly of devices, such as a television and a set-top box or PVR which interfaces to the data network 120.

The data network 120 provides network communications support for the user computer 110 to interact with other devices, including the listing provider server 130 and the telephony server 140. The data network 120 is packet-switched and may comprise one or more public and/or private data networks and may include one ore more Local Area Networks (LANS), Wide Area Networks (WANs), Storage Area Networks (SANs). The data network 120 may include or be the Internet and may utilize the Internet Protocol.

The listing provider server 130 may be a typical web server that includes a processor, memory and storage devices. The listing provider server 130 includes a communications interface that allows listing provider server 130 to communicate with user computer 110, telephony server 140 and other computing devices over the data network 120 using one or more of the communications protocols described above. The communications interface may be a NIC. The listing provider server 130 serves Internet web pages and related data, Internet yellow pages (IYP) listings, Internet search results, and/or other listings to user computer 110 and other computing devices. The listing provider server 130 is a web server and may include software to be one or more of an application server, graphics server, database server, transaction server, and others. The listing provider server 130 may run an operating system, such as, for example, a version of the Microsoft Windows operating system, Linux, Unix, Apple MAC OS, and others.

Although only one listing provider server 130 is shown, the listing provider server 130 may represent any number of web servers. The listing provider server 130 may represent a group of servers, network capable storage devices, routers, gateways and other communications devices. In addition, the listing provider server 130 may be coupled with or communicate over data network 120 with other servers that provide telephone and other directories, databases and/or other services.

The telephony server 140 may be a specialized server that includes a processor, memory and storage devices. The telephony server 140 includes a communications interface that allows telephony server 140 to communicate with user computer 110, listing provider server 130, and other computing devices over the data network 120 using one or more of the communications protocols described above. The communications interface may be a NIC.

Although only one telephony server 140 is shown, the telephony server 140 represents any number of web servers. The listing telephony server 140 may represent a group of servers, network capable storage devices, routers, gateways, switches and other communications devices. In addition, the telephony server 140 may be coupled with or communicate over data network 120 with other servers that provide telephone and other directories, databases and/or other services.

In one embodiment, the listing provider server 130 and the telephony server 140 may be combined as a single device or group of devices.

The telephony server 140 may be coupled with soft switch 145. The telephony server 140 may include a telecommunications interface that allows telephony server 140 to communicate with soft switch 145. The soft switch 145 may serve as a voice switch, telephony switch, data switch, circuit switch, an IP switch, and/or a combination of two or more of these. The soft switch 145 serves as an interface between information communicated between the packet-switched data network 120 provided via telephony server 140 and the voice network 150. The soft switch 145 may be compliant with one or more of the communications standards described above, as well as one ore more additional communications standards including the session initiation protocol (SIP), H.323, the media gateway control protocol (MGCP), also known as megaco, RFC-3015 and H.248), the session announcement protocol (SAP), the session description protocol (SDP), the simple gateway control protocol (SGCP), the skinny client control protocol (SCCP) and other protocols. The soft switch 145 may be compliant with one or more telecommunications standards such as SS6 and SS7 described below. The soft switch 145 is compatible with the voice network 150, and has the ability to set up and tear down telephone connections in the voice network 150.

The soft switch 145 may serve as a signaling gateway platform (SGP), which is an intelligent service exchange node that integrates services between circuit switched and packet switched networks. In another embodiment, a gateway, not shown, may be included between the soft switch 145 and the voice network 150. The soft switch 145 and the telephony server 140 may be combined as a single device or group of devices. In another embodiment, the soft switch 145, the telephony server 140, and the listing provider server 130 may be combined as a single device or group of devices.

The voice network 150 is a common carrier network which provides telephone service between users. The voice network 150 may be or include a circuit switching network, a packet switching network, a data network, an IP telephony network, or include or be a combination thereof. The voice network 150 may be the public switched telephone network (PSTN). The voice network 150 may operate according to one or more telephony standards such as, for example, Common Channel Interoffice Signaling (CCIS), Common Channel Signaling 7 (C7), Signaling System 6 (SS6), Voice Over Internet Protocol (VOIP), and Signaling System 7 (SS7) standards. The voice network 150 may also operate according to one or more of the communications standards, the additional communications standards described above, and/or other communications standards.

The user telephone 115 and merchant telephones 161, 162 and 163 may be analog telephones connected to the voice network 150. The user telephone 115 and merchant telephones 161, 162 and 163 may be digital devices for providing voice communications, such as, for example, SIP or MGCP enabled telephone sets. The user telephone 115 and merchant telephones 161, 162 and 163 may also be wireless voice communications devices such as cellular telephones or other mobile telephones. As used herein the terms "telephone" and "phone" refer to analog telephones, digital telephones, cellular telephones, satellite telephones, IP telephones, and telephones supporting VoIP, SIP, MGCP and other telephony protocols. There may be one or more user telephones 115 located proximate to the user computer 110 and/or in a location under common control of the user of the user computer 115. Although only three merchant telephones 161, 163 and 163 are shown, an unlimited number of merchants having telephones may be included in the system topology 100. Although not shown, the merchants included in the topology 100 may have in addition to or in place of the merchant telephones 161, 162, and 163 other computing devices which are capable of allowing a merchant to receive data and/or voice communications from and/or send data and/or voice communications to one or more user telephones 115 and/or the telephony server 140.

The hardware and software of the invention and its functions may be distributed such that some components are performed by user computer 110, the listing provider server 130, the telephony server 140, the soft switch 145, and/or others. The processes described herein may be embodied in whole or in part in software which operates on the listing provider server 130, the telephony server 140 and/or the soft switch 145 and operates in conjunction with the user computer 110, the merchant telephones 161, 162 and 163, and the user telephone 115. When implemented in software, the invention may be one or more of or a combination of application programs, applets (e.g., a Java applet), browser plug-ins, a COM objects, dynamic linked libraries (DLLs), scripts, subroutines, operating system components or services, terminate and stay resident (TSR) programs, and/or other software entities. Some or all of the software may be stored on storage media included in or accessible to the devices shown in topology 100. Some of the software may be stored on field programmable gate arrays (FPGAs), application specific integrated circuits (ASICs), programmable logic devices (PLDs) and programmable logic arrays (PLAs) included in one or more of the devices shown in topology 100. The devices shown in topology 100 may include various specialized units, circuits, software and interfaces for providing the processes described herein.

Figure 2:
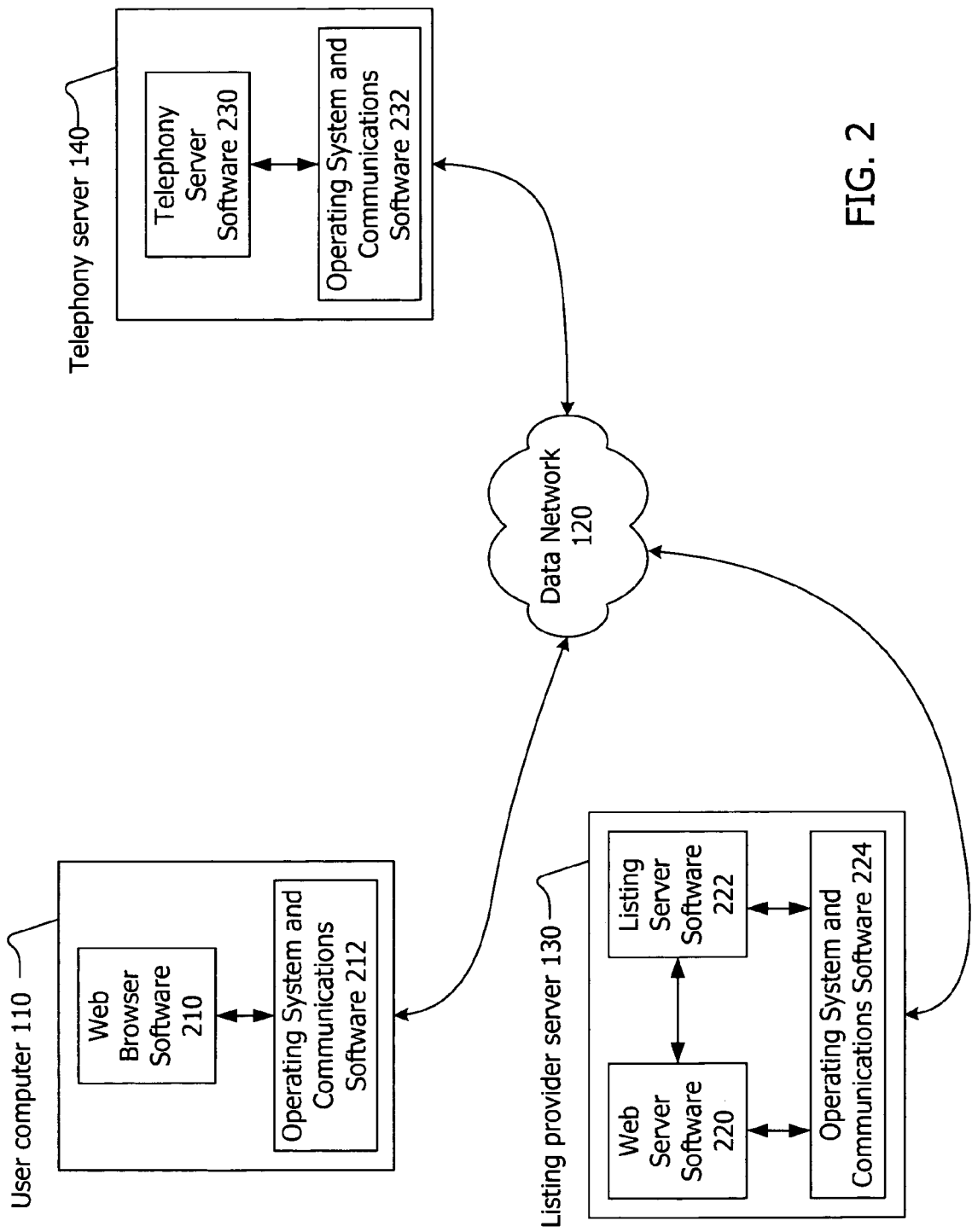
FIG. 2 is a block diagram showing software included in a user computer, a listing provider server, and a telephony server computer.

FIG. 2 is a block diagram showing software included in the user computer 110, the listing provider server 130, and the telephony server computer 140. To achieve the reverse billing in online search processes described herein, the user computer 110 may include and execute an operating system and communications software 216 which support user communication over data network 120 via web browser software 210. Web browser software may be a dedicated Internet browser such as Microsoft Internet Explorer and Mozilla Firefox, may be part of an Internet software bundle such as Netscape Communicator, may be an online access program that provides support for Internet browsing such as America Online and NetZero, or may be another application program that allows for Internet browsing. The web browser software 210 and operating system and communication software 212 may be stored on a storage device included in, coupled with or otherwise accessible to the user computer 210, such as, for example, hard disk 117. The web browser software 210 may provide support for various communications over data network 120 such as, for example, the Hyper-Text Transfer Protocol (HTTP); may support multimedia display standards that may include mark-up languages such as the Hyper-Text Markup Language (HTML), the Extensible Markup Language (XML) and others; and may support executable applets and other programming techniques such as the Microsoft .NET framework and Java.

The listing provider server 130 may include and execute an operating system and communications software 224 which support communication over data network 120 by web server software 210 and listing server software 222. The listing server software 222 and web server software 220 may be combined as a single software component. The listing server software may receive and respond to a user request for an IYP search or other listing of merchants or otherwise respond to an online search for a product, merchant or service. The listing server software may include and/or have access to one or more databases of merchant information which may be available locally to or remotely from the listing provider server 130. The response prepared by the listing server software 222 includes a software link, object, applet, hook or other software entity that allows the user of user computer 110 to initiate a duplex voice communication session with a merchant by clicking on or otherwise activating the link. The link is referred to herein as a "user activatable link." The user activatable link may be in HTML and may cause a Common Gateway Interface (CGI) script to be executed. The CGI script may be written using C, Perl, Java, Visual Basic, or other programming language. The user activatable link may be activated by a user using an input device to select the text, graphic, button or other user interface item associated with the merchant. The user activatable link, which may include one ore more CGI scripts, causes the telephony software 230 on telephony server 140 to initiate the process beginning in block 322 described in FIG. 3 below.

The telephony server 140 may include operating system and communications software 232 and telephony software 230. When the user at user computer 110 clicks on or otherwise activates a user activatable link to initiate a duplex voice communication session with a merchant, the request for the duplex voice communication session is sent to and handled by the telephony server software 230. As used herein, the term "duplex voice communications" refers to voice communications which are in two directions so that each of two parties to a call can speak to the other party concurrently. As used herein the term "session" means a connection that is established between two entities that remains open until terminated or torn down. Duplex voice communication sessions are traditionally made over the voice network 150, but as used herein may be made over one or both of the data network 120 and the voice network 150.

A Process

Figure 3:
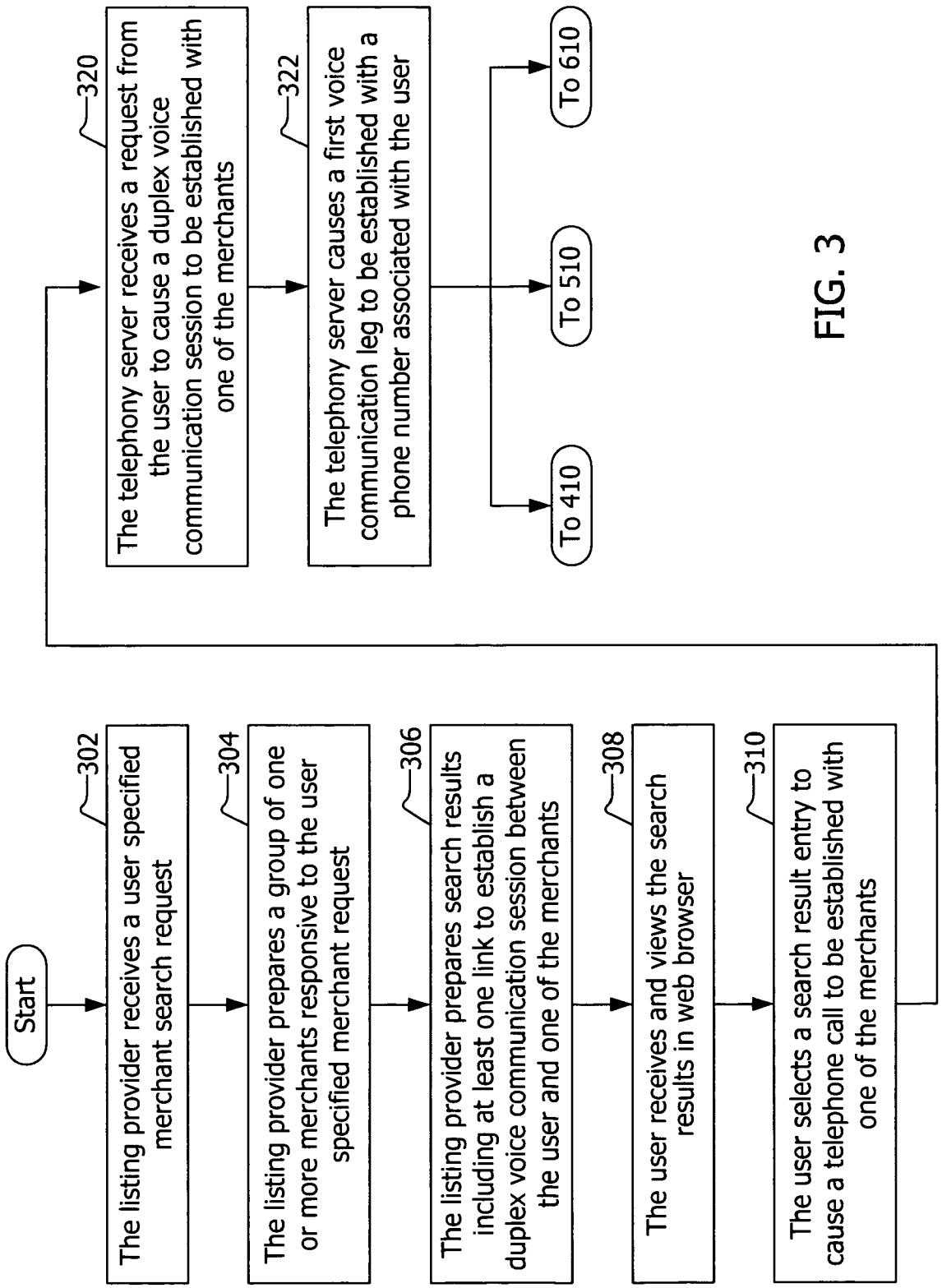
FIG. 3 is a flow chart of an initial portion of a process of establishing a duplex voice communications session.

Referring now to FIG. 3 there is shown a flow chart of an initial portion of a process by which a duplex voice communications session is established. A user may search for a merchant in a geographic area using a web browser. As used herein, a "user" is any person who uses an Internet browser. As used herein, a "merchant" includes any person or entity offering a product or service, including individuals, companies, corporations, professionals, tradesmen, nonprofit entity, government entity, restaurants, and professionals. Examples of merchants include: painters, plumbers, electricians, restaurants, grocery stores, card shops, sporting goods stores, automotive repair shops, lawyers, accountants, doctors, and many others. Merchants may be grouped according to one or more characteristics, including the product or service they provide and the geographic region in which they are located, as in traditional yellow pages.

A user may conduct an online or Internet search for a good, product, service or merchant in a geographic area, or other similar search. The online search may be made using key words, that is, terms or phrases that describe the good, product, service or merchant desired to be located. The online search may be made by accessing an online listing or search provider which shall be referred to herein collectively as listing providers. Listing providers as used herein include, IYP websites, such as, for example, smartpages.com, yellowpages.superpages.com, and switchboard.com; Internet search engines such as, for example, Google at google.com or Yahoo at yahoo.com; and accessing other on-line search services and listing providers. An IYP website or other listing provider website may provide a user interface that allows a user to click on or otherwise select headings for a kind of merchant and a geographical designation such as a city, county and/or state or an associated telephone area code or zip code. The IYP interface may allow a user to enter a kind of merchant and geographical information in text entry boxes. Similarly, when specifying the online search using an Internet search engine, the user may type in a kind of merchant and geographical information in the search text entry box. The user may initiate the search by clicking on a "search" or "go" button or other user interface item.

The listing provider receives a user specified merchant search request, as shown in block 302. The listing provider prepares a group of one or more merchants responsive to the user specified merchant request, as shown in block 304. The listing provider prepares search results including a user activatable link to establish a duplex voice communication session between the user and one of the group of one or more merchants, as shown in block 306. The link may be a simple HTTP link included in a web page of search results. The user activatable link may be a software link, object, applet, hook or other software entity that allows a user to request establishment of a voice communication session, such as an HTML link that may include one or more CGI scripts. The user activatable link may provide a graphical user interface or other user interface to allow a user specify certain characteristics of a desired merchant, such as, for example, a merchant that is geographically closest, willing to perform a service within a user specified or selectable price range, immediately available or soonest available, and other characteristics.

The user receives and views the search results in a web browser, as shown in block 308. The user selects a search result entry to cause a telephone call to be established with one of the group of merchants, as shown in block 310. The user selection may be made by the user via a mouse or other input device to click on text, an icon, a button or other user interface item, or to otherwise activate a user activatable link associated with a specific merchant or a user activatable link associated with a generic description of a merchant. (described below)

The telephony server 140 receives a request from the user to cause a duplex voice communication session to be established with one of the merchants, as shown in block 320. The telephony server 140 causes a first voice communication leg to be established with a phone number associated with the user, as shown in block 322. As part of the functionality of block 322 or otherwise in response to block 320, the telephony server 140 may request or retrieve the user's telephone number. The user's telephone number may be obtained during an earlier subscription to the listing provider website, such as, for example, when the user established a Yahoo email account or registered as a user of a listing provider, search engine or other website. As such, the user's telephone number may be retrieved from a cookie stored by the user's Internet browser or from a database or other information stored and associated with the user by the listing provider server 130 or the telephony server 140. If the user's telephone number was not earlier provided, the telephony server 140 may request the user's telephone number via a pop-up window or other user interface technique. The user's telephone number may be the telephone number of user telephone 115 adjacent the user computer 110, of a mobile telephone of the user, or other telephone number.

The first voice communication leg may be established by the telephony server 140 sending a call initiation signal to the soft switch 145. The call initiation signal instructs the soft switch 145 to initiate a single leg telephone call with the user's telephone number.

Figure 4:
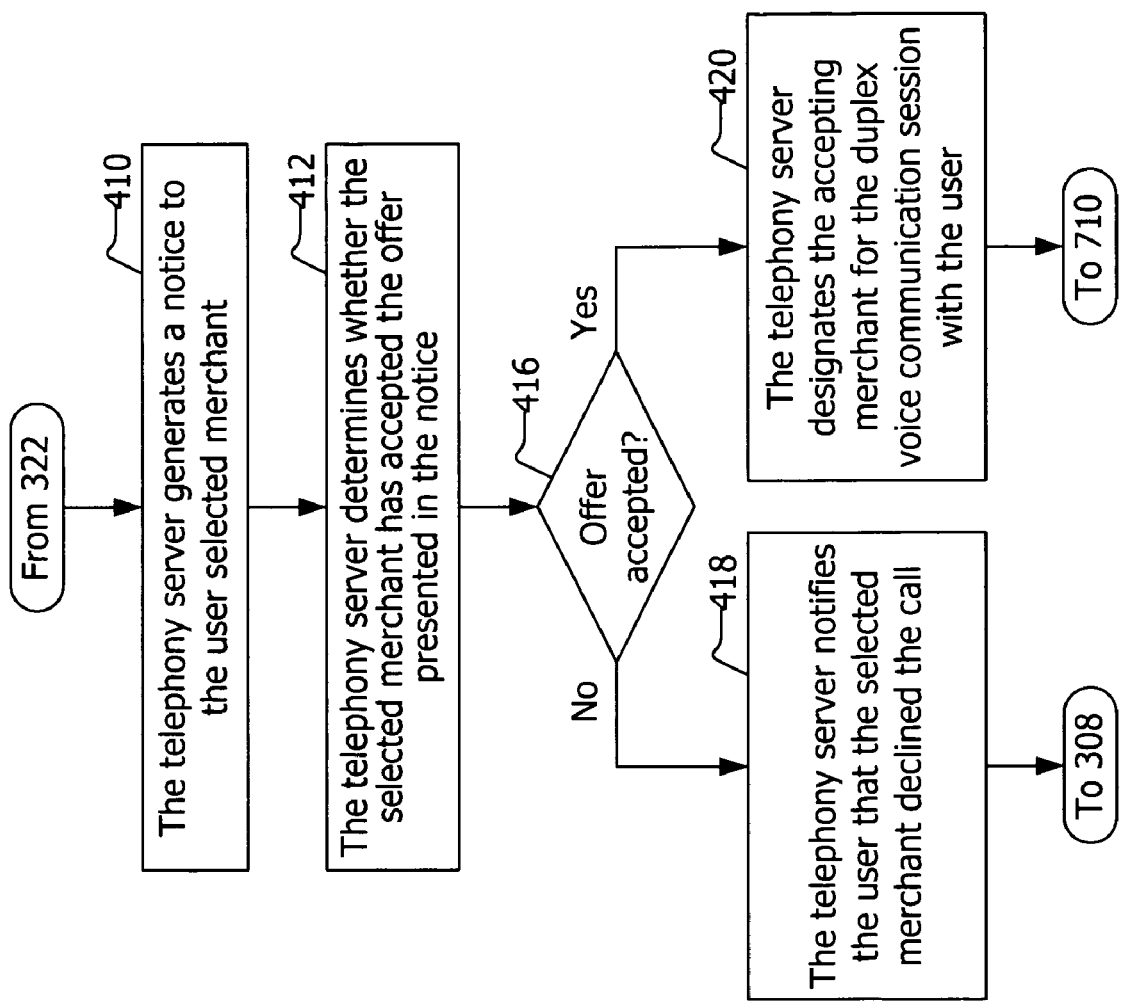
FIG. 4 is a flow chart of a portion of a process of establishing a duplex voice communications session in which a user selected merchant is notified of a user's request to speak with the merchant.
Figure 5:
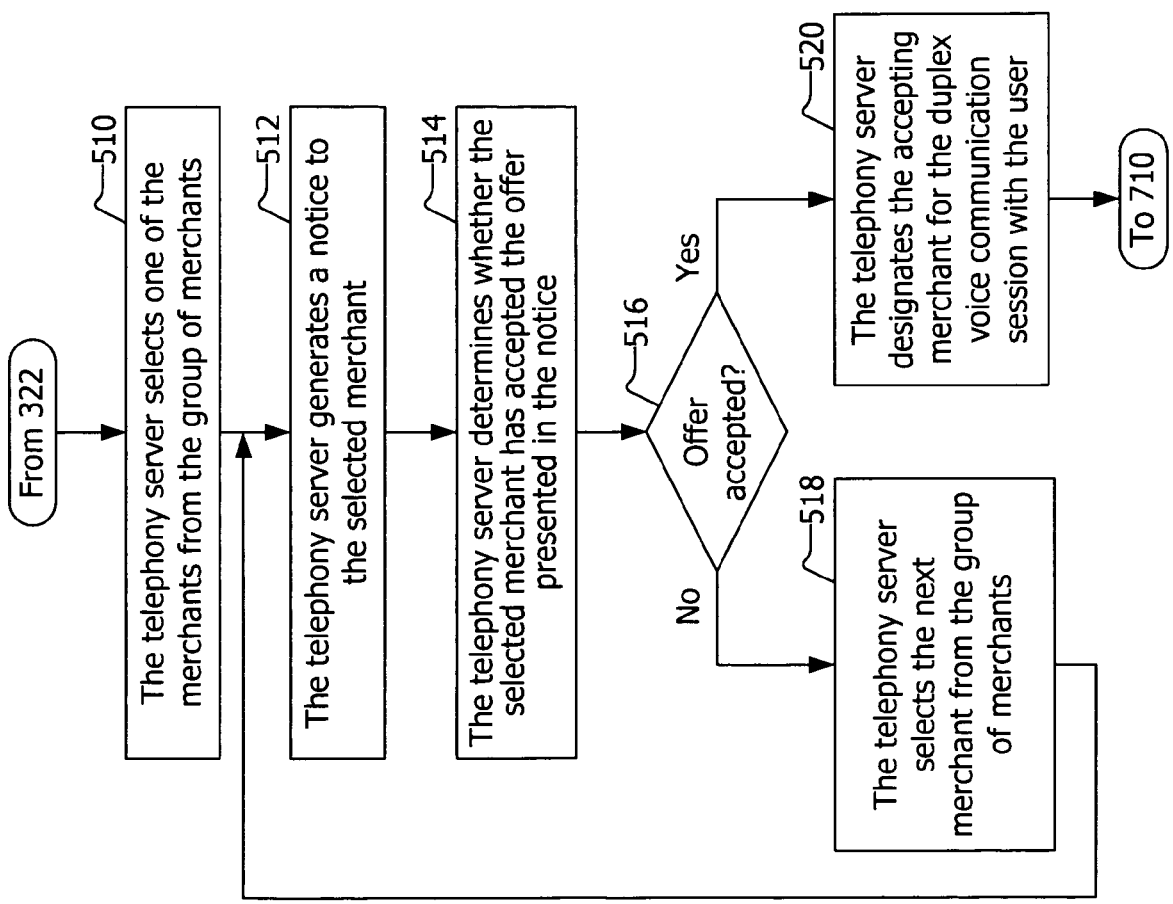
FIG. 5 is a flow chart of a portion of a process of establishing a duplex voice communications session in which multiple merchants may be sequentially notified of a user's request to speak with a merchant.
Figure 6:
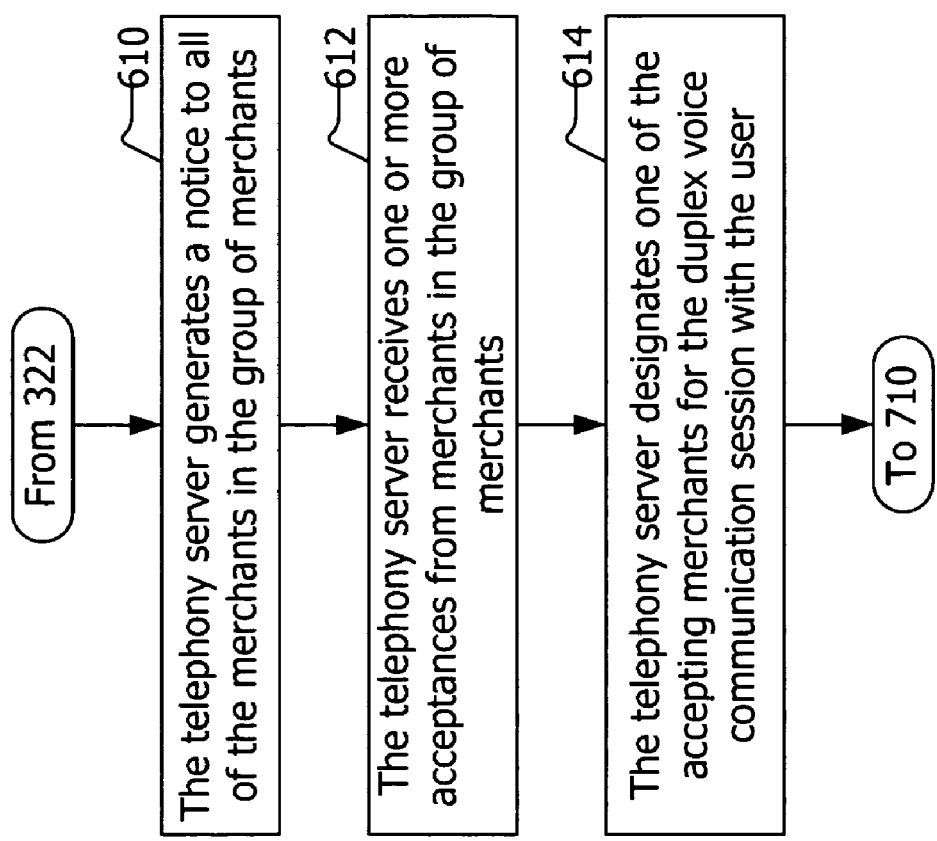
FIG. 6 is a flow chart of a portion of a process of establishing a duplex voice communications session in which multiple merchants may be simultaneously notified of a user's request to speak with a merchant.

The flow of actions then continues with block 410 in FIG. 4, block 510 in FIG. 5 or block 610 in FIG. 6, depending on the embodiment.

While the user is waiting for a call with a merchant to be established (before or after block 322) and while the processing described in FIGS. 4, 5, and 6 proceeds, an audio, video or multimedia advertisement may be played or displayed to a user. An audio advertisement may be played while the user is on the phone waiting for a merchant to accept the offer. The advertisement may be may be provided on the user's computer as a graphic, a web page, a video, or other single media or multi-media advertisement. The advertisement may be related to the search made by the user, may be based on demographics associated with geographic information included in the search, may be based on demographics associated with the user's IP address or telephone number, and may be wholly unrelated to the user or the search.

Referring now to FIG. 4 there is shown a flow of actions taken in notifying a user selected merchant of a user's request to speak with the merchant. In this embodiment, one or more specific merchant entries included in the search results (see block 306) have a user activatable link associated therewith, and the user may cause a telephone session to be initiated with a user selected merchant by selecting and activating a user activatable link to a specific merchant. If the merchant accepts the call, the user is connected with the merchant, and the costs for the telephone call and automatic call initiation service are billed to the merchant as a definite fee. In this embodiment, users may easily cause a telephone call to be established automatically with a merchant the user has proactively selected. The call establishing technology is invisible to the web user. This process removes the need for a user to pick up a telephone and call a merchant after making an Internet search. This process allows listing providers the ability to track lead generation performance.

More specifically, referring now to block 410, the telephony server 140 generates a notice to the user selected merchant. The notice includes an offer for the selected merchant to pay a definite fee in exchange for establishment of a duplex voice communication session with the user. The definite fee is an exact, known fee the merchant agrees to pay for the call regardless of the length of the call or whether the call results in a purchase, order, contract, transaction, or anything beneficial to the merchant. Once the merchant accepts the call, the definite fee known to the merchant is fixed. For example, the definite fee may be $1.00, $1.50, $2.00, $5.00, etc. In some circumstances, the amount of time allowed for accepting should be kept low to provide the most customer pleasing experience possible to users of the call initiation system. As such, the notice may inform the merchant of an amount of time the offer remains available (or, conversely, expires), such as, for example, 20 seconds, 30 seconds, 45 seconds, 1 minute, etc. In another embodiment, the definite fee for acceptance increases over time to serve to motivate the merchant to more quickly accept the bid, thus improving the customer's experience with the call initiation system. For example, the notice may state that the definite fee is $1.00 if the merchant accepts the offer within 30 seconds, to be increased by $1.00 every 10 seconds after 30 seconds, with the offer expiring after one minute.

In another embodiment, the notice may include a message stating that the call has been placed using a service offered by a listing provider. In this embodiment, the definite fee for establishing the telephone call may be paid by the listing provider. In this way, the brand or name recognition of the listing provider is strengthened by alerting merchants to the services provided by the listing provider. The merchant may be notified in the message that the listing provider is paying for the costs of connecting the call. (In this embodiment, the notice does not include an offer to the merchant to accept the call and pay a definite fee for the lead.)

The notice may be sent in a variety of different ways. The notice may be provided via the data network 120 and/or via the voice network 150. The notice may be sent via a voice network leg to the merchant's analog telephone or cellular telephone, via voice network to the merchant's personal computer or other computing device, via both the voice and data network to the merchant's IP telephone (such as an SIP or MGCP telephone), to a merchant's specialized device on an analog line via the voice network, to the merchant's pager or Blackberry device via the voice network, and in other ways.

The notice may be, for example an automated voice solicitation provided via a voice network leg to the merchant, may be an email note, may be a test message, and others.

The telephony server determines whether the selected merchant has accepted the offer presented in the notice, as shown in block 412. The acceptance of the offer may be a voice notification, via a Dual Tone Multi-Frequency (DTMF) based notification (also known as touch tones), or other form of notification which the telephony server 140 can receive and properly interpret. The telephony server 140 may include voice recognition software to process the acceptance. Other forms of acceptance include email, Internet message, cellular telephone text message, and other communications from a computing device.

The flow of actions continues based on whether the merchant accepted the offer, as shown in block 416. If the offer is not accepted by the user selected merchant, as shown in blocks 416 and 418, the telephony server 140 notifies the user that the selected merchant declined the call. This user notification may be made by audio message on the already established first voice communication leg (see block 322), via a web page, via a pop up window, and in other ways. The flow of actions may continue at block 308, discussed above. The first voice communication leg may be torn down at this point.

When the offer is accepted, as shown in blocks 416 and 420, the telephony server 140 designates the accepting merchant for the duplex voice communication session with the user. The telephony server 140 designates the accepting merchant for the duplex voice communication session with the user, as shown in block 420. The merchant may then participate in a voice telephone call with the user and may reap the benefits of the lead generated by the user's Internet or IYP search. The flow of actions continues with bock 710 of FIG. 7.

In one embodiment, the listing provider includes all of the group of merchants in search results to be provided to the user. In this embodiment, one or a small subgroup of the group of merchants in the search results may have a user activatable link associated with it. Merchants may be allowed to pay and/or bid for placement in the subgroup. The subgroup may be, for example, from two to six or more merchants in size.

In another embodiment, in response to receiving a user request for a listing of merchants in a geographic area, a listing or search results that includes a generic merchant description having a user activatable link associated therewith is provided to the user. The user may cause a telephone session to be initiated with a merchant by clicking on or otherwise activating the user activatable link. The costs for the telephone call and automatic call initiation service are billed as a definite fee to the merchant accepting the call with the user. In this embodiment, the listing provider includes in the search results a generic description reflecting the contents of the group of merchants. Example generic descriptions include, for example, a. "Bonded plumbers in zip code 12345"
b. "Qualified painters in SomeCity, SomeState"
c. "Certified public accountants in the 123 area code"
d. "Italian restaurants within 5 miles of 123 Main Street, SomeCity, SomeState"
e. "Estate planning attorneys in zip code 12345."

In this embodiment, the search results may include the generic description as well as a list of some or all of the group of merchants. However, in this embodiment, only the generic description may include a user activatable link to establish a duplex voice communication session between the user and one of the group of merchants. The generic description may appear at the top of the search results, adjacent to the search results on the same web page, and/or may appear in a pop-up window. Instructions may be provided near the generic description instructing the user to click on the generic description and/or an icon, button or other user interface item to initiate a telephone call with a geographically desirable merchant ready, willing and able to provide the service or goods desired.

The flow of actions then continues with block 510 of FIG. 5 or block 610 of FIG. 6, depending on the embodiment. The flow of actions shown in FIG. 5 describes a process for sequentially, iteratively seeking a merchant to accept a call with the user to respond to the user's request. This embodiment may be referred to as sequential bid dialing or sequential notification. The flow of actions shown in FIG. 6 describes a process for simultaneously seeking a merchant to accept a call with the user to respond to the user's request. This embodiment may be referred to as simultaneous bid dialing, parallel bid dialing, simultaneous notification, and parallel notification.

As with FIG. 4, in another embodiment of FIGS. 5 and 6, the notice may include a message stating that the call has been placed using a service offered by a listing provider. In this embodiment, the definite fee for establishing the telephone call may be paid by the listing provider. In this way, the brand or name recognition of the listing provider is strengthened by alerting merchants to the services provided by the listing provider. The merchant may be notified in the message that the listing provider is paying for the costs of connecting the call. (In these embodiments, the notice does not include an offer to the merchant to accept the call and pay a definite fee for the lead.)

Referring now to the flow of actions in FIG. 5, a notice including an offer to handle the user's telephone call is sent sequentially to one merchant at a time. The offer is made to each of the merchants in the group of merchants until either the offer is accepted or has been provided to all of the merchants in the group. More specifically, the telephony server 140 selects one of the merchants from the group of merchants, as shown in block 510. This selection may be made in a variety of ways based on one ore more of a variety of criteria, such as, for example: randomly in round robin among the entire group of merchants; in priority order based on geographic closeness of the merchant to the user; in order of customer satisfaction data associated with the merchant; in an order based on paid placement in which the merchants may pay and/or bid to be the first in the group or toward the top of the group; and others.

The telephony server 140 generates a notice to the selected merchant, as shown in block 512. The notice includes an offer for the selected merchant to pay a definite fee in exchange for establishment of a duplex voice communication session with the user. For example, the definite fee may be $1.00, $1.50, $2.00, $5.00, etc. In some circumstances, the amount of time allowed for accepting should be kept low to provide the most customer pleasing experience possible to users of the call initiation system. As such, the notice may inform the merchant of an amount of time the offer remains available (or, conversely, after which it expires), such as, for example, 20 seconds, 30 seconds, 45 seconds, 1 minute, etc. In another embodiment, the definite fee for acceptance increases over time to serve to motivate the merchant to more quickly accept the bid, thus improving the customer's experience with the call initiation system. For example, the notice may state that the definite fee is $1.00 if the merchant accepts the offer within 30 seconds, to be increased by $1.00 every 10 seconds after 30 seconds, with the offer expiring after one minute.

The notice may be sent in a variety of different ways such as those described above regarding block 410 of FIG. 4. The notice may be, for example an automated voice solicitation provided via a voice network leg to the merchant.

The telephony server determines whether the selected merchant has accepted the offer presented in the notice, as shown in block 514. The acceptance of the offer may be a voice notification, via a Dual Tone Multi-Frequency (DTMF) based notification (also known as touch tones), or other form of notification which the telephony server 140 can receive and properly interpret. The telephony server 140 may include voice recognition software to process the acceptance. Other forms of acceptance include email, Internet message, cellular telephone text message, and other communications from a computing device.

The flow of actions continues based on whether the merchant accepted the offer, as shown in block 516. If the offer is not accepted by the selected merchant, as shown in blocks 516 and 518, the telephony server 140 selects the next merchant from the group of merchants. As above regarding block 510, the next merchant made be determined in various ways based on one or more of a variety of criteria. The flow of actions loops to block 512, discussed above. The looping through blocks 512, 514, 516 and 518 continues until a merchant accepts the offer to receive the call for a definite fee or until the group of merchants is exhausted.

When the offer is accepted by a merchant, as shown in blocks 516 and 520, the telephony server 140 designates the accepting merchant for the duplex voice communication session with the user. As a result, a duplex voice communication session is established between the user and the designated merchant as shown beginning with block 710 of FIG. 7. The merchant participates in a voice telephone call with the user and may reap the benefits of the lead generated by the user's Internet or IYP search.

Referring now to the flow of actions shown in FIG. 6, the notice may be sent to one or more of the merchants in the group of merchants simultaneously, meaning at about the same time. In simultaneous bid calling, there is competitive bidding between the selected merchants for the opportunity to obtain the call with the user. In one embodiment, the first in time of the merchants to accept a definite offer fee is the designated merchant. In another embodiment, the merchant making the highest bid within a prescribed amount of time wins. The amount of time provided for bidding may be 30 seconds, 45 seconds, 1 minute, 90 seconds, etc. In some circumstances, the amount of time allowed for bidding should be kept low to provide the most customer pleasing experience possible.

More specifically, in simultaneous notification with simultaneous bidding, the telephony server 140 generates a notice to all of the merchants in the group of merchants, as shown in block 610. The notice is sent simultaneously, at the same time, or as close in time as practicably achievable. The notice may be sent as described above regarding block 410. The notice may state something to the effect that to be connected via a duplex telephone call with an Internet user interested in the services or goods offered by the merchant, the merchant must accept an offer. The notice also provides instructions and/or the rules to be followed in accepting the offer. The offer may be a made according to various rules, such as, for example, first in time to respond, the largest bid made with in a specified time, and others.

One example notice states the offer is being sent to a group of merchants, and the first merchant to agree to pay a definite fee in exchange for establishment of a duplex voice communication session with the user will be awarded the opportunity to participate in the telephone call with the user. The definite fee may be $1.00, $1.50, $2.00, $5.00, etc. To increase the merchant's chances of being awarded the call with the user, the merchant should respond as quickly as possible.

Another example notice states that the offer is being sent to a group of merchants, that the offer is for a limited time, that the offer must be equal to or greater than a minimum or starting bid amount, that the merchant accepting the offer placing the largest bid during the time period will be awarded the opportunity to participate in the telephone call with the user. For example, the limited time may be 20 seconds, 30 seconds, 45 seconds, 1 minute, etc.; and the minimum or starting fee may be $1.00, $1.50, $2.00, $5.00, etc. To increase the merchant's chances of being awarded the call with the user, the merchant can provide an acceptance with a bid significantly larger than the starting bid. This may be referred to as variable rate billing, even though the end result is a definite fee to be paid by the merchant when the telephone call with the user is established.

In a more advanced implementation, bidding updates may be provided to members of the group during regular intervals during the bidding time period. The regular intervals may be for example, every 20 seconds, every 30 seconds, etc. The bidding updates may include the current high bid and the time remaining in the offer. The bidding updates may be provided via the data network 120 and/or via the voice network 150 such as, for example, via existing telephone legs on the voice network 150 using automated voice generation; via email or text message to the mobile telephone, merchant computer or other merchant computing device via either the data or the voice network, and other techniques.

According to the process, the telephony server 140 receives one or more acceptances from merchants in the group of merchants, as shown in block 612. The telephony server designates one of the accepting merchants for the duplex voice communication session with the user, as shown in block 614. The telephony server may designate an accepting merchant based on one or a combination of metrics, such, for example, first in time to respond, largest bid received in a prescribed period of time such as, for example, 30 seconds, 45 seconds, 1 minute, 90 seconds, etc. The flow of actions continues with block 710 of FIG. 7.

Figure 7:
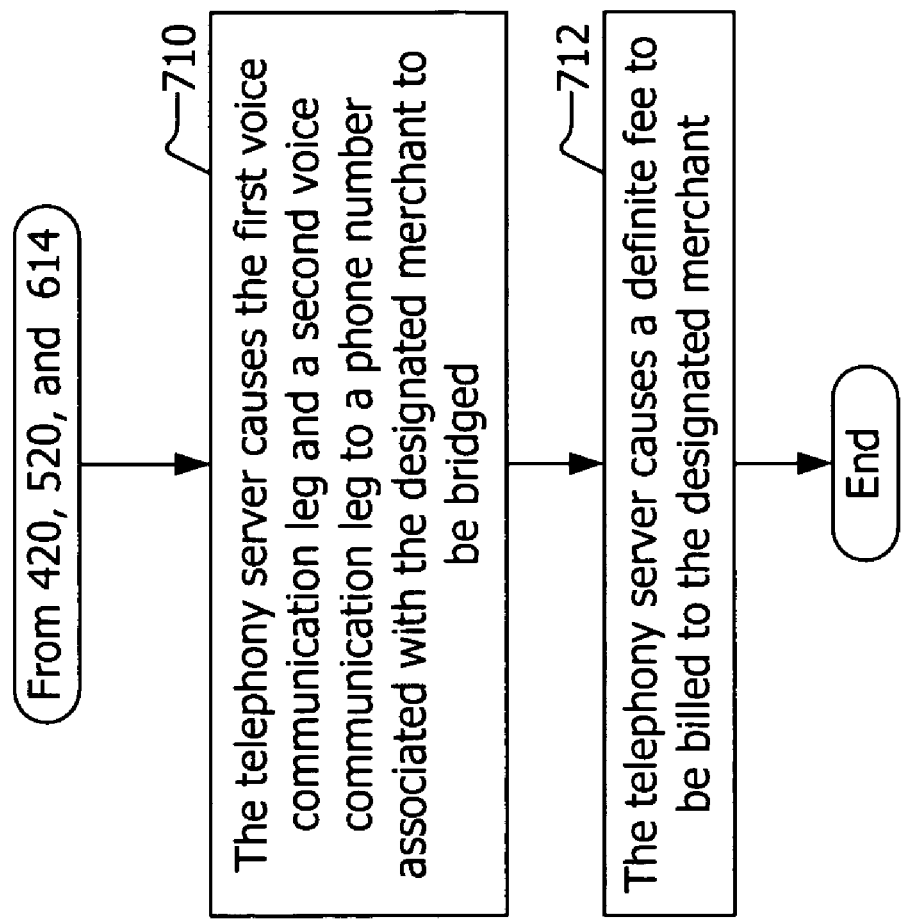
FIG. 7 a flow chart of the actions taken in completing a duplex voice communication call between a user and a merchant.

Referring now to FIG. 7, there is shown a flow of the actions taken in completing a duplex voice communication call between the user and a designated merchant. After a merchant has been designated according to the processes described in FIGS. 3, 4, 5 and 6, the telephony server 140 causes the first voice communication leg and a second voice communication leg to a phone number associated with the designated merchant to be bridged, as shown in block 710. As a result, a duplex voice communication session is established between the user and the designated merchant. The second voice communication leg may already exist as it may have been the communications medium used by the telephony server 140 to deliver the notice and receive the acceptance. If the second leg has not yet been established, the telephony server causes the second telecommunications leg to be established with the designated merchant. The second voice communication leg may be established by the telephony server 140 sending a call initiation signal to the soft switch 145. The call initiation signal instructs the soft switch 145 to initiate a single leg telephone call with the designated merchant's telephone number. The first and second voice communication legs are bridged to establish duplex telecommunications between the user and the designated merchant. The bridging of the first and second voice communications legs may be achieved by the telephony server 140 sending instructions to the soft switch 145 to bridge the first and second voice communication legs. The merchant and the user may then discuss the user's needs and how the merchant may fulfill the user's requirements. For example, the user may make a dinner reservation, order food to be delivered, make a haircut appointment, learn whether an item is in stock at a store, obtain a quote for a service, purchase an item from the merchant, etc.

The costs of the process of establishing a phone call between a user and a merchant may be born by the designated merchant in the form of the definite fee. In one embodiment, the telephony server 140 causes the definite fee to be billed to the designated merchant, as shown in block 712. The definite fee may be billed to the designated merchant's local telephone account as an enhanced service. To achieve this, the telephony server 140 provides billing information including the definite fee to the local exchange carrier (LEC) associated with the merchant as determined by the merchant's telephone number. The billing information passed to the LEC includes the originating and destination telephone numbers, the definite fee. The billing may be achieved using a Carrier Access Billing System (CABS) and may be performed in a manner similar to that of a collect call. Telephony server 140 may validate the merchant telephone number with a telephony or carrier database.

In another embodiment, when the listing provider pays the fee for establishing the user/merchant telephone call, block 712 is replaced by charging the definite fee for establishing the telephone call to the listing provider.

With regard to FIGS. 4, 5, 6 and 7, additional and fewer steps may be taken, and the steps as shown may be combined, further refined and rearranged to achieve the process described herein. For example step 322 may be performed immediately before step 710, and the second voice communication leg to the designated merchant may be established before the first voice communication leg to the user is established.

Although exemplary embodiments of the invention have been shown and described, it will be apparent to those having ordinary skill in the art that a number of changes, modifications, or alterations to the invention as described herein may be made, none of which depart from the spirit of the invention. All such changes, modifications and alterations should therefore be seen as within the scope of the invention claimed.

It is claimed:

1. A process performed by a server, the process comprising:
    (a) the server receiving a request over a data network from a computing device of a user to cause a duplex voice communication session over a voice network to be established between a user telephone associated with a user phone number of the user and a merchant telephone associated with a merchant phone number of a merchant from a group of one or more merchants capable of providing a good or service specified in the request, wherein the user telephone is separate and distinct from the computing device of the user
    (b) the server causing a first voice communication leg to be made to the user phone number
    (c) the server generating a notice to all of the merchants in the group of merchants capable of providing the good or service specified in the request at approximately the same time, the notice including an offer to establish the duplex voice communication session with the user in exchange for payment of a definite fee
    (d) the server receiving from at least one accepting merchant an acceptance of the offer
    (e) when the acceptance is received from only one merchant, the server designating the only accepting merchant as the designated merchant
    (f) when the acceptance is received from more than one accepting merchant, the server selecting one of the accepting merchants as the designated merchant as a result of competitive bidding between the accepting merchants, the selecting based on the accepting merchant making the highest bid for the duplex voice communications session
    (g) the server causing a second voice communication leg to be made to the designated merchant at the merchant phone number
    (h) the server causing the first voice communication leg and the second voice communication leg to be bridged to thereby establish the duplex voice communication session over the voice network between the user telephone associated with the user phone number of the user and the merchant telephone associated with the merchant phone number of the designated merchant
    (i) the server causing the definite fee to appear on a bill for telephone service of the designated merchant.

2. The process of claim 1 wherein the request is triggered by the user activating a user activatable link accessible via a screen display coupled with the computing device of the user.

3. The process of claim 1 further comprising, before step (b), the server obtaining the user phone number.

4. The process of claim 1 wherein the request in step (a) is made as a consequence of the user viewing results of a key word search, the user viewing the results on a display coupled with the user computing device.

5. The process of claim 1 wherein the group of one or more merchants is provided as a consequence of the user initiating a key word search via the computing device of the user.

6. The process of claim 1 wherein in step (i) the definite fee appears as a charge for an enhanced service on the designated merchant's bill for telephone service.

7. The process of claim 1 wherein the notice comprises at least one from the group comprising an automated voice solicitation, an instant text message, and an electronic mail message.

8. The process of claim 1 wherein the acceptance of the offer in step (d) comprises one or more from the group comprising a voice notification, a touch tone based notification, an instant message, and an email message.

* * * * *